United States Patent
Chien

(10) Patent No.: US 8,254,892 B2
(45) Date of Patent: Aug. 28, 2012

(54) METHODS AND APPARATUS FOR ANONYMOUS USER IDENTIFICATION AND CONTENT PERSONALIZATION IN WIRELESS COMMUNICATION

(75) Inventor: Herman Chien, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 89 days.

(21) Appl. No.: 12/468,708

(22) Filed: May 19, 2009

(65) Prior Publication Data

US 2009/0227290 A1    Sep. 10, 2009

Related U.S. Application Data

(63) Continuation of application No. 10/006,936, filed on Dec. 5, 2001, now Pat. No. 7,551,913.

(51) Int. Cl.
*H04W 4/00* (2009.01)
*H04M 1/00* (2006.01)
*H04K 1/00* (2006.01)

(52) U.S. Cl. .................. 455/414.1; 455/558; 380/274

(58) Field of Classification Search .... 455/414.1–414.4, 455/418–420, 458; 380/274; 705/74
See application file for complete search history.

(56) References Cited

U.S. PATENT DOCUMENTS

| | | | |
|---|---|---|---|
| 5,915,226 A | 6/1999 | Martineau | |
| 6,081,708 A * | 6/2000 | Vasnier | 455/426.1 |
| 6,122,639 A | 9/2000 | Babu et al. | |
| 6,226,519 B1 * | 5/2001 | Van Doorselaer et al. | 455/450 |
| 6,310,889 B1 | 10/2001 | Parsons et al. | |
| 6,370,374 B1 | 4/2002 | Eichinger et al. | |
| 6,373,949 B1 | 4/2002 | Aura | |
| 6,484,022 B1 | 11/2002 | Findikli et al. | |
| 6,510,513 B1 * | 1/2003 | Danieli | 713/156 |
| 6,542,740 B1 | 4/2003 | Olgaard et al. | |
| 6,600,930 B1 * | 7/2003 | Sakurai et al. | 455/414.3 |
| 6,606,491 B1 * | 8/2003 | Peck | 455/411 |
| 6,677,894 B2 * | 1/2004 | Sheynblat et al. | 342/357.46 |
| 6,725,303 B1 * | 4/2004 | Hoguta et al. | 710/106 |
| 6,742,038 B2 * | 5/2004 | Britt, Jr. | 709/228 |
| 6,771,981 B1 | 8/2004 | Zalewski et al. | |
| 6,813,503 B1 | 11/2004 | Zillikens et al. | |
| 6,961,587 B1 * | 11/2005 | Vilppula et al. | 455/558 |
| 7,458,080 B2 * | 11/2008 | Parker et al. | 719/318 |
| 7,551,913 B1 * | 6/2009 | Chien | 455/411 |
| 7,613,479 B2 * | 11/2009 | Twigg et al. | 455/558 |
| 2001/0016906 A1 | 8/2001 | Brebner | |
| 2001/0036224 A1 * | 11/2001 | Demello et al. | 375/220 |
| 2003/0087652 A1 | 5/2003 | Simon et al. | |
| 2003/0119482 A1 | 6/2003 | Girard | |
| 2003/0133423 A1 * | 7/2003 | LaDue | 370/330 |
| 2006/0223582 A1 * | 10/2006 | Simola | 455/558 |

\* cited by examiner

*Primary Examiner* — Matthew Sams
(74) *Attorney, Agent, or Firm* — Moazzam & Associates, LLC

(57) ABSTRACT

Methods and apparatus for providing personalized content to a user of a wireless network include establishing an anonymous user identifier and delivering the user identifier to a content provider. Based on the user identifier, communication with a predetermined data source is established or predetermined data content is selected. In some embodiments, a device identifier is provided in addition to the user identifier and device specific, personalized content is delivered to the user. In one example, a device identifier and a user identifier are based on a mobile station serial number and a subscriber identity module, respectively, and are used in an HTTP header. The anonymous user identifier can be based on a subscriber identity module (SIM) serial number, or a hash of the SIM serial number so that user information such as a user phone numbers is not available to content providers.

17 Claims, 3 Drawing Sheets

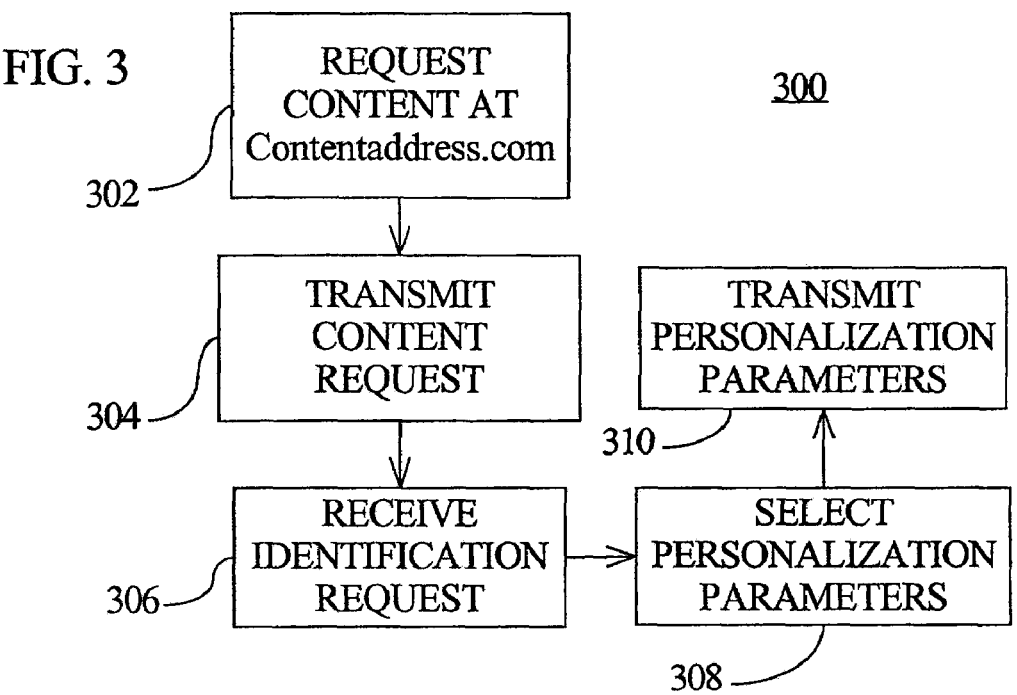
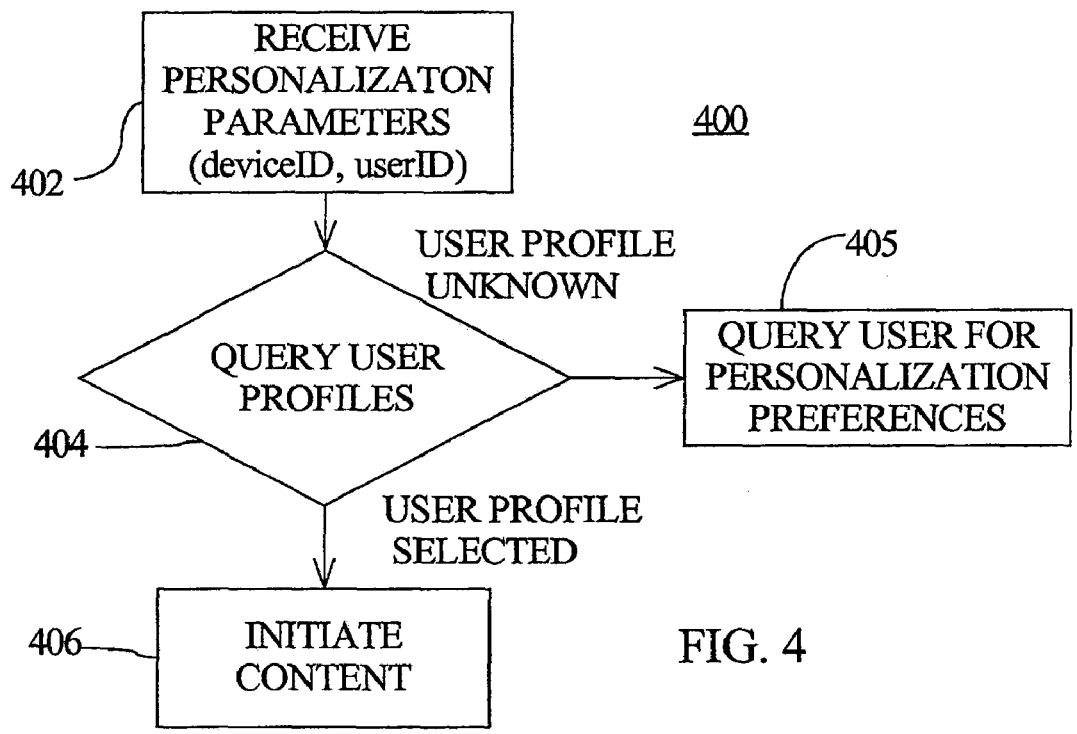

METHODS AND APPARATUS FOR ANONYMOUS USER IDENTIFICATION AND CONTENT PERSONALIZATION IN WIRELESS COMMUNICATION

FIELD OF THE INVENTION

The invention pertains to methods and apparatus for providing user identification in wireless communications.

BACKGROUND AND SUMMARY

Wireless communication systems typically offer limited communication bandwidths and/or data rates. One method of enhancing data communication is to limit total data transfers to and from a user by providing customized data to the user. As a result, system data capacity is available for transfer of selected data, and is not wasted on data inappropriate for, or unwanted by a particular user.

Data customization in wireless communication can based on a communication device serial number. For example, a cell phone used by a network subscriber to access a wireless network includes a device serial number. While the network can be configured to provide data to this cell phone based on the serial number, such data customization is inadequate for another user of the same cell phone. In addition, a user of multiple shared cell phones can receive data content configured differently based on different cell phones, and not based on user identification. Not only is unwanted data communicated to the user, wasting network capacity so that the network appears slow, inappropriate personal data or user content preferences selected based on a device serial number can be provided to another user. Such inappropriate data can include personal data or other information that the user wishes to remain private. Due the ease of exchange of cell phones in networks based on standards such as the Global System for Mobile Communication (GSM), association of individual users based on cell phone serial number is inadequate for data customization.

In one example of serial number based interaction, a keyword that requests return of a device serial number is provided in a Web page. If the user responds in a manner which invokes the keyword, a device serial number is appended to a device model number and the combined number is transmitted. Because of the likelihood that a selected cell phone is used by more than a single user, content providers typically restrict the extent of content personalization available based upon device serial numbers.

In view of the shortcomings of content personalization based on device serial numbers, methods, systems, and apparatus are needed for anonymous content personalization.

Communication devices include a register configured to store a user identifier and a transmitter configured to transmit the user identifier to a network. According to representative embodiments, communication devices also include a register configured to store a device identifier, and the transmitter is configured to transmit the device identifier to the network. In additional examples, the communication devices include a processor, and a user input interface is configured to supply commands to the processor. The user identifier is an anonymous identifier that does not enable discovery of sensitive personal information such as a telephone number and can be based on a serial number defined in a subscriber identity module (SIM). In some embodiments, the processor is configured to encrypt at least one of the device identifier and the user identifier before transmission to the communication network. In other embodiments, the user identifier is hashed prior to transmission or prior to delivery to a content provider.

Cell phones include a display configured to display data and commands and a keypad or other user input interface for data entry and command entry. A subscriber identity module (SIM) includes a user identifier and a transmitter is configured to transmit the user identifier. In additional examples, the cell phone includes a memory location configured to store a device identifier, and the transmitter is configured to transmit the device identifier. In a representative example, the user identifier is associated with a SIM serial number.

Subscriber identity modules for a wireless network include a memory configured to retain a SIM identifier and a processor configured to supply the SIM identifier to a communication device. According to representative examples, the processor is configured to provide a hash of the SIM identifier to the communication device.

Content providers include a personalization interface configured to receive personalization data and a processor configured to provide content to a user based on personalization data. According to some examples, content providers include a database configured to store personalization data. In further examples, the personalization interface is configured to receive personalization data associated with an HTTP header. In additional representative examples, the personalization interface is configured to receive personalization data that includes a device identifier and the processor provides device-specific content based on the device identifier. In still other examples, the personalization interface is configured to receive personalization data from a mobile station and receive a user identifier that is stored on a subscriber identification module (SIM). In some examples, the user identifier is a SIM serial number.

Methods of providing personalized content in a wireless communication network include selecting an anonymous user identifier and selecting content based on the user identifier. According to a representative example, the user identifier is selected based on a subscriber identity module. In other examples, methods include selecting a device identifier. In further embodiments, the device identifier and the user identifier are compared with a set of user profiles and content is selected based on a selected user profile.

Methods of obtaining anonymous personalized content include selecting an anonymous user identifier and identifying content for delivery based on the anonymous user identifier. In some examples, the anonymous user identifier is based on a serial number of a subscriber identification module.

These and other features of the invention are described below with reference to the accompanying drawings.

BRIEF DESCRIPTION OF THE DRAWINGS

FIG. 3 is a block diagram illustrating an alternative method of requesting personalized content.

FIG. 4 is a block diagram illustrating a method of configuring a content provider for delivery of personalized content.

DETAILED DESCRIPTION

Transmission of content personalization indicators in an unsecured wireless network can present security issues as such indicators can be intercepted, permitting unauthorized users to access sensitive personal information. In addition, users typically wish to remain anonymous and do not intend to reveal user phone numbers or other personal data. Use of a device serial number as a personalization indicator does not generally reduce network security as such numbers can be freely exchanged. However, content personalization based on device serial numbers is limited to customization based on a communication device that may or may not be associated with a particular user.

Figure 1:
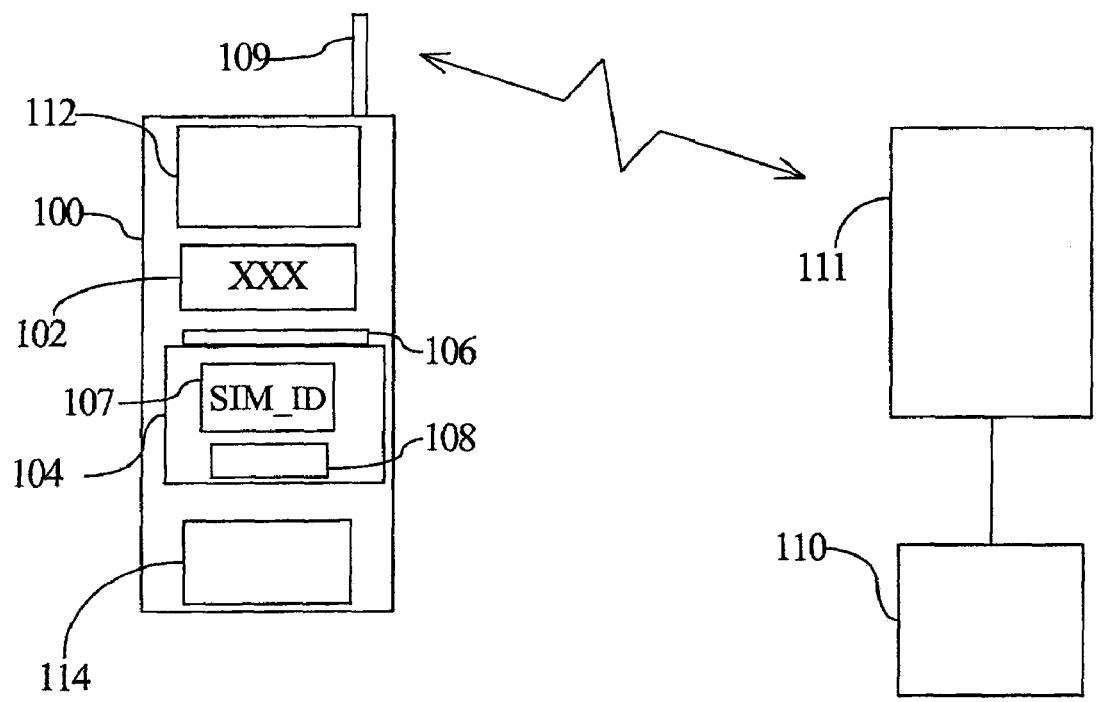
FIG. 1 is a block diagram illustrating communication between a wireless communication device and a content provider.

With reference to FIG. 1, a wireless communication device 100 such as a cell phone, handheld computer, or other device is provided with a device serial number 102 and a subscriber identity module (SIM card) 104 that is retained by a SIM connection 106. The SIM card 104 includes a microprocessor/memory system 108 configured to store subscriber identifiers and in some examples, can be configured to encrypt voice and/or data communications, or provide cryptographic parameters for such encryption. The communication device 100 includes an antenna 109 configured to transmit one or more subscriber identifiers to a content provider 110 via a wireless or other communication network 111. The communication device 100 is also configured to exchange voice and data transmissions with the network 111. As shown schematically in FIG. 1, the SIM card 104 is configured to fit within the communication device 100, and is generally configured to be removable for use in additional communication devices. For example, a single SIM card 104 can be used with a variety of communication devices of a single user, such as one or more cell phones or handheld computers. The communication device 100 also includes a display 112 and a keypad 114 or other input device for input of alphanumerical values, retrieval of commands and data stored in on-board memory, and transmission of commands to the network 111 and the content provider 110.

The network 111 can be configured to provide data service based on, for example, the General Packet Radio Service (GPRS) and/or the Global System for Mobile Communication (GSM) digital cellular service. In wireless systems based on the Global System for Mobile Communication (GSM), the SIM card 104 is configured to provide an international mobile subscriber identity (IMSI) to the wireless network. The IMSI typically includes a unique subscriber identifier including, for example, a home country and carrier. The SIM card 104 is also configured to provide a mobile station ISDN number (MSISDN). Generally communication of the MSISDN to a content provider is undesirable because the MSISDN contains the subscriber phone number and users generally wish to remain anonymous.

In addition to the microprocessor/memory system 108, the SIM card 104 also includes a SIM_ID 107 that is typically provided at least in part by the SIM card manufacturer and is based on, for example, date and time of manufacture, manufacturer batch number, or other identifiers supplied by the manufacturer. The SIM_ID (or SIM ICCID) typically includes static digits that indicate application, mobile country code, and mobile network code. In addition, the SIM_ID includes variable digits associated with SIM vendor, network profile, a sequential number, and a checksum value for assessing SIM_ID integrity. Because portions of the SIM_ID can be obtained by trial and error, the SIM_ID can be hashed so that recovery of subscriber or other information is more difficult.

The communication device 100 can be configured to transmit the SIM_ID to the network 111 and/or the content provider 110. Because the SIM_ID is established by the manufacturer and is not associated with security-sensitive user identification parameters such as the user's MSISDN and IMSI, communication of the SIM_ID generally presents fewer privacy and security concerns. For enhanced security and anonymity, the SIM_ID can be processed by, for example, the processor 108 or other processor before transmission. For example, the SIM_ID can be processed with a hash function to produce a hash value that is associated with a particular user. Recovery of the SIM_ID from the hash value is difficult, and transmission of the hash value instead of the SIM_ID enhances security.

In the example of FIG. 1, a SIM_ID serves as a user identifier and a device serial number serves as a device identifier, but other user identifiers and device identifiers can be used. For example, the MSISDN can be used, and, to enhance privacy, can be hashed before delivery to a content provider. Delivery of a hashed MSISDN to a content provider typically would not be sufficient to permit the content provider to determine the user's phone number or to obtain other information necessary to contact the user. An MSISDN can be hashed based upon additional private data provided by a wireless network, so that the hashed MSISDN can be provided without loss of anonymity and can be confidently associated with a particular user. Cryptographic keys or other security parameters associated with a SIM can be used. For enhanced security and privacy, such parameters can be hashed. An international mobile station equipment identity (IMEI) can be used as a device identifier. Other identifiers can also be used.

In the example of FIG. 1, the keypad 114 is used for entry of personalization parameters, but other input devices can be used such as touchpads, voice inputs, handwriting pads, pointing devices, and others. These input devices can be associated with, for example, voice or handwriting recognition methods. For convenience, such input devices are referred to as user input interfaces.

Figure 2:
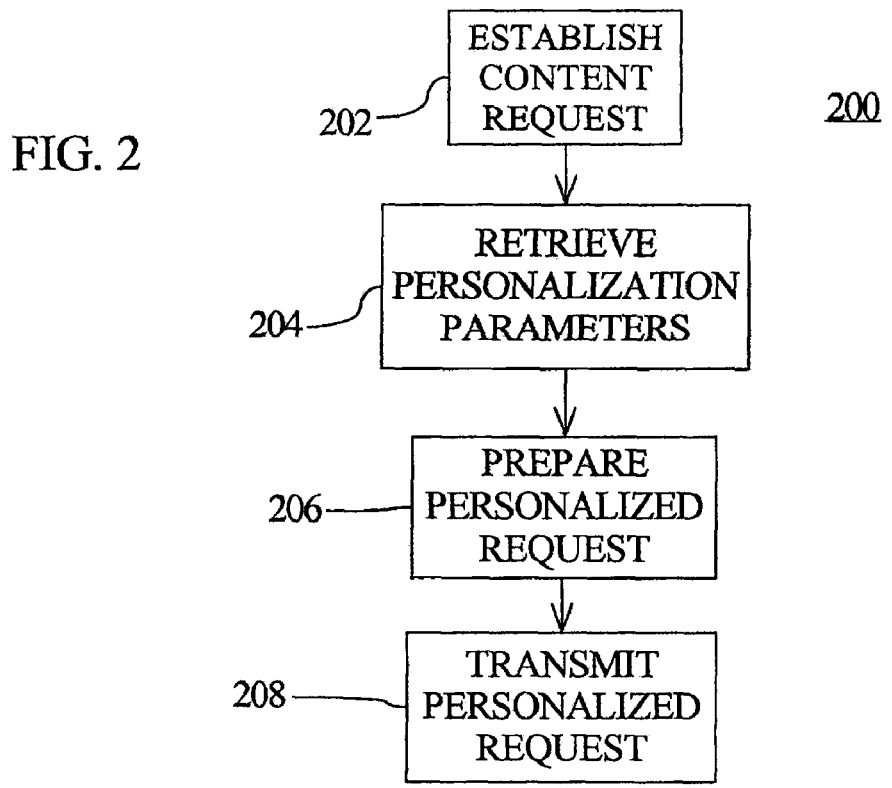
FIG. 2 is a block diagram illustrating a method of requesting personalized content.

Referring to FIG. 2, a method 200 of requesting personalized content based on, for example, an HTTP protocol includes a step 202 of selecting a content specific command such as, for example, a request for a specific Web page or connection to a particular data service. In a step 204, content personalization parameters such as a device identifier and a user identifier are retrieved. Representative examples of such parameters include a cell phone serial number, other device serial number, and a SIM_ID. In a step 206, a personalized content request is prepared based on the personalization parameters. The personalized content request generally includes a specification of a selected content with a command that can be represented as Get contentaddress/content. Content personalization parameters such as device and user personalization parameters can be specified by, for example, corresponding headers such as Device Serial No: XYZ and User ID: 123, respectively. In a step 208, the personalized content request is transmitted to, for example, a wireless network or other communication network. Based on the content personalization parameters, a content provider can configure, for example, a web page content.

Personalized content requests can also be configured in other ways. An alternative method 300 of content personalization is illustrated in FIG. 3. In a step 302, a request for specific content at an address Contentaddress.com is selected and in a step 304 this request is transmitted. In a step 306, a request for identification is received from, for example, a content provider or a network component such as a Mobile Switching Center (MSC) and in step 308, one or more or of a user identifier, a device identifier, or a device serial number, or other identifier is selected. In a step 310, the selected identifiers are transmitted as, for example, a portion of an HTTP header. The method 300 can be configured to transmit fewer or additional personalization parameters in one or more transmission steps. For example, a content request can initially include a device serial number in an HTTP header, as, for example, "Manufacturer_Name/Model_No." After a request for identification is received, a user can determine if additional identifiers are to be transmitted in the step 308. If transmission of additional identifiers is selected, an additional header or a modified header is transmitted that includes, for example, one or both of a device serial number and a user identifier. For example, such a header can include device maker, device model number, device serial number, and SIM card serial number (SIM_ID) in an HTTP header of the form "Maker/Model_No/DevSerNo/SIM_Ser_No." Such a header permits user and device identification and permits content personalization based on either or both. The methods of FIGS. 2-3 are illustrated with reference to HTTP protocols, but methods can be implemented in other ways.

With reference to FIG. 4, a method 400 of configuring a content provider for personalized content includes receiving one or more personalization identifiers including, for example, one or more of a device maker, a device model number, a device serial number, and a SIM card serial number in step 402. In the method 402 of FIG. 4, a device identifier deviceID and a user identifier userID are provided, but other personalization identifiers or other combinations of one or more such identifiers can be provided. In the example of FIG. 4, personalization identifiers associated with a single user are associated with two or more communication devices. For example, a single user identifier userID can be associated with two or more cell phones, personal digital assistants, handheld computers, or other communication devices. As used herein, a combination of identifiers such as a device identifier and a user identifier are referred to as a user profile. A collection of one or more user profiles is referred to as a family of user profiles. A family of user profiles for a user having two cell phones associated with respective device identifiers phone_1 and phone_2 includes the user profiles (phone_1, userID) and phone_2, userID). In addition, a user profile can include a content identifier, a device parameter, or other parameters. For example, a user profile based on device and user identifiers phone_1, userId, respectively, can include a content identifier such as MyHomePage to form the user profile (phone_1, userID, MyHomePage). In communication based on this example user profile, communication with MyHomePage is established.

User profiles are queried in a step 404 to determine if a particular communication request is associated with a known user profile. If a user profile corresponding to the received personalization parameters (deviceID, userID) is not located, the user can be requested to establish, edit, or modify a user profile in a step 405. Based the personalization parameters, a personalized content request is initiated in a step 406. As a specific example of such personalization, content requests from a first device can be associated with content types or content formats that can differ from a second device. For example, a user can establish a user profile so that a first cell phone can be associated with a user preference for sports related content. A second cell phone, associated with the same user, can be associated with a preference for financial data. Thus the user profiles (phone_1, userID) and (phone_2, userID) can be associated with sports content and financial content, respectively. When use of the first or second cell phones is initiated, specific types of content can be requested, without requiring querying the user. For example, a user connection to an internet-based news service can be personalized for sports or financial data based on user profiles. Alternatively, the step 405 can be omitted or content personalization can be provided for a single user profile associated with a particular communication device.

Personalized content appropriate for a particular communication device can be based on properties of the communication device, user location, user calendar data, or otherwise configured. For example, a communication device with a low resolution display can request personalized content that is suitable for the display while a communication device with a higher resolution display requests higher resolution images. Alternatively, a user can associate a particular cell phone with use in a particular location or application, and configure a user profile accordingly. For example, a selected cell phone can be configured for use at home and for which sports content is requested. A particular communication device can include a sophisticated audio system or completely lack audio. Accordingly, the user profiles of such devices can be associated with audio-rich content or to avoid audio content. Communication devices configured especially for audio applications can be personalized based on device audio capabilities via, for example, a device identifier and according to user musical or other preferences based on a user identifier. A family of profiles can be associated with calendar data, time of day data, or otherwise configured. For example, a user profile associated with identification of restaurant locations can be used to provide appropriate restaurant data based on time of day so that coffee shop content is preferred in the morning. Geographical data can also be used in conjunction with a user profile. As a result of such personalization, user-preferred content can be selected and delivered and unwanted content can be avoided, thus conserving network data capacity while providing an apparently faster or more useful network.

In other examples, users can establish one or more user personalization profiles associated with a communication device to select content for delivery. For example, a communication device having audio capabilities can be associated with a user profile that is configured to block or limit delivery of audio content. As a result, content is delivered based on user preferences and not solely on communication device capabilities. In some examples, types of content appropriate for a particular communication device are included in a hypertext transfer protocol (HTTP) header that is delivered to a content provider. Based on a user personalization profile, one or more of these content types can be requested, or delivery of one or more content types can be indicated as unwanted. Such user profiles permit a user to conserve communication bandwidth, communication device processing power, battery life, or other parameter based on user preferences.

Figure 5:
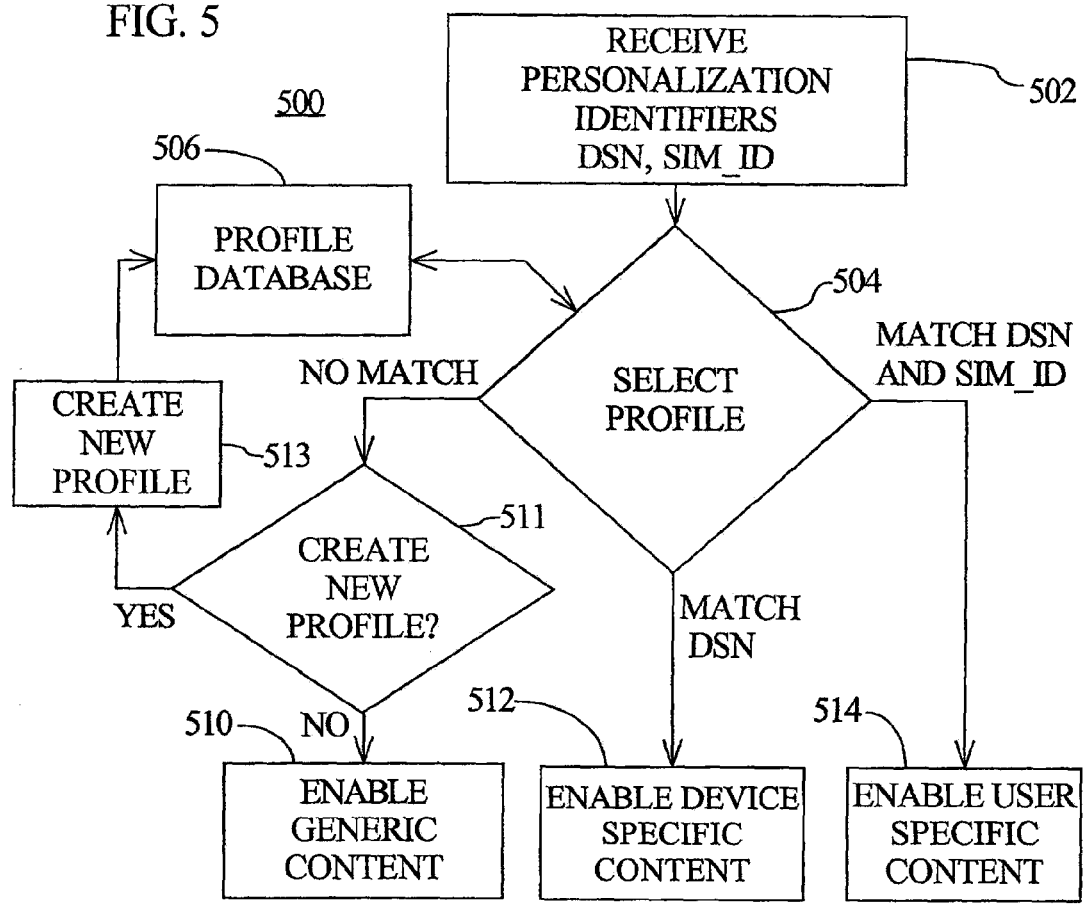
FIG. 5 is a block diagram illustrating a method of providing personalized content.

Referring to FIG. 5, a method 500 of providing personalized content includes a step 502 of receiving personalization identifiers such as a device serial number DSN and a SIM card serial number SIM_ID. Additional, fewer, or alternative personalization identifiers can be used, In a step 504, the device serial number DSN and the SIM card serial number SIM_ID are compared with a family of user profiles that are retrieved from a database 506. If the device serial number DSN and the SIM card serial number SIM_ID do not appear in a user profile in the family and/or the device serial number DSN is unrecognized, association of a content request with a particular user is incomplete, and standard content parameters are assigned in a step 510. Such standard content parameter can be configured generically to be neither device specific nor user specific. Alternatively, if a user profile is not identified, a profile development procedure 511 can be executed. For example, the device serial number DSN and the SIM card serial number SIM_ID can be used to define a user profile that is provided to the profile database 510 in a step 513. The device serial number DSN and the SIM card serial number SIM_ID can be provided to the profile database 506, based on communication based on parameters associated with generic content. If a device specific identifier such as a device serial number matches a stored profile and an associated user identifier is unmatched, device specific content parameters are assigned in a step 512. Alternatively, content personalization parameters can be configured so that device specific customization is available only to users associated with additional, non-device specific personalization identifiers such as the SIM card serial number. For example, a service subscriber could access device customization/personalization features only as a subscriber to a customization/personalization service that is associated with a user identifier. If the device serial number DSN and the SIM card serial number correspond to a user profile in the database, user-specific personalization parameters are established in a step 514.

Figure 6:
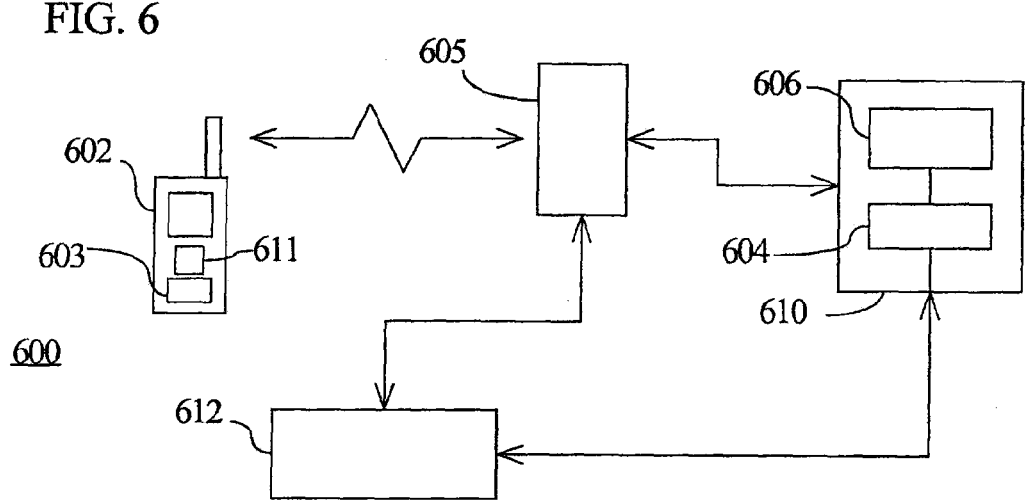
FIG. 6 is a block diagram illustrating a communication system that includes a content provider having a personalization interface.

With reference to FIG. 6, a communication system 600 for providing personalized content to a wireless communication device such as a cell phone 602 that is in communication with a wireless network 605. A content provider 610 includes a personalization interface 604 that is configured to receive a user identifier and a device identifier from the cell phone 602 and typically includes a processor such as a personal computer, workstation, parallel processor, processor network, or other devices. The content provider 610 can be configured to provide data and services such as financial data, entertainment, messaging, or other services. The personalization interface is also configured to receive content instructions from, for example, the cell phone 602, an internet connection, or from a registration database 606 based on stored user preferences or user preferences that are provide in other ways. The cell phone 602 includes a processor 603 configured to transmit personalization identifiers to the personalization interface 604 and that can be obtained from, for example, a SIM 611. The content provider 610 can be configured to communicate with the cell phone 602 via a Publicly Switched Telephone Network (PSTN) 612 or directly with the wireless network 605. In some examples, the registration database 606 can be included in the wireless network 605 and configured for access by one or more content providers. For example, an internal content provider 615 can be included in the wireless network 605 and personalization data provided only for content providers within the wireless network 605.

Representative embodiments are described above. In other examples, a user identifier is provided that is based on, for example, a stored value provided by, for example, a SIM card or otherwise provided. The stored value can be assigned by a user or pre-assigned by a manufacturer or communication device vendor. In some examples, security of personal information is enhanced by independent selection of such values without association with sensitive personal information such as subscriber phone numbers, billing information, or other sensitive information.

In some examples, content personalization is described with reference to obtaining data from a particular source by, for example, targeting a selected web address, connecting to a selected information service, selecting a data category, or a data type such as audio, video, or text data. In other examples, content personalization includes personalization based on information presentation parameters such as image resolution, audio quality, text page size, or other parameters. Such information presentation parameters can be selected based upon one or both of a user identifier and a device identifier. In addition, content personalization based on data source, data type, or information presentation parameters can be configured in conjunction with user location or user calendar information.

User profiles can be used to provide subclasses of content personalization. For example, a user connection to a game download service can be personalized based on a user profile. A user can associate a particular communication device with resources available in the device such as memory, processing power, display resolution, and/or other parameters. The game service then presents the user with downloads appropriate to the device resources based on the selected user profile. If the game service does not recognize the user profile, the user can be queried to establish a new or additional profile. In this and other examples, a content provider can be configured to deliver content based on one or both of a device identifier and a user identifier.

Example embodiments are described with reference to cell phones, but other mobile stations can be used. A mobile station typically includes a transceiver, an antenna, and control circuitry and can be mounted in a vehicle, used as a portable handheld device, and is configured to communicate with a base station. Base stations typically include one or more transmitters and receivers and are configured for full duplex communication with one or more mobile stations and a mobile switching center (MSC) or a mobile telephone switching office (MTSO). A MTSO generally includes a processor configured to monitor, track, arrange handoffs, and keep track of billing information as well as arrange communication with a wire-based communication system. A wireless network usually includes one or more mobile stations that communicate with one or more base stations that in turn communicate with a MSC or MTSO.

Aspects of the invention are described above with reference to example embodiments. It will be apparent to those skilled in the art that these embodiments can be altered in arrangement and detail without departing from the scope of the invention and these representative embodiments should not be taken to limit the scope of the invention. We claim all that is encompassed by the appended claims.

What is claimed is:

1. A method for transmitting personalized content to a first communication device that has processed a SIM card serial number of a SIM card with a hash function to produce a hash value associated with a user, the hash value combined with a first device identifier from the first communication device being used with the SIM card to create a first user profile, and has transmitted the combined hash value and first device identifier to a communication network, the method comprising:

associating a plurality of personalization parameters with the combined hash value and a plurality of first device specific content parameters with the first device identifier in a first user profile, wherein when the first communication device requests a content, the personalization parameters and the first device specific content parameters are delivered to a content provider and the content provider provides the first communication device with personalized and device specific content, wherein the plurality of personalization parameters are combined with a plurality of second device specific content parameters associated with a second communication device sent from the second communication device when the SIM card is in the second communication device to create a second user profile, the first user profile and the second user profile together creating a family of user profiles for the user, wherein second user profile is accessed when content is requested from the second communication device, and the first user profile is accessed with content is requested from the first communication device.

2. The method of claim 1, wherein the first device identifier is an MSISDN to further identify the user.

3. The method of claim 2, wherein the MSISDN is combined with a second hash function, the second hash function provided by the communication network.

4. The method of claim 1, wherein the first device identifier is a device serial number, the device serial number and the SIM card serial number defining a first user profile.

5. The method of claim 1, wherein the personalization parameters are entered using a keypad of one of the first and second communication devices.

6. The method of claim 1, wherein the first device identifier is an international mobile station equipment identity (IMEI) to further identify the user.

7. A system for transmitting personalized content, comprising:
   a communication network;
   a first device on the communication network, wherein the first device sends a request for personalized content through the communication network, the request for personalized content including a personalization parameter, the personalization parameter associated with a a hash value, and a first device specific content parameter, the first device specific content parameter associated with the first device identifier, to create a first user profile, the hash value created by processing a SIM card serial number of a SIM card being used with the first device and a hash function;
   a content provider in communication with the network which
      receives the request for personalized content including the personalization parameter and the first device specific content parameter from the network once the network identifies the first user profile as corresponding to the hash value and the first device identifier,
      configures a content according to the personalization parameter and the first device specific content parameter, and
      sends the content to the network;
   wherein the hash value is combined with a second device identifier from a second device when the SIM card is in the second device to create a second user profile, the first user profile and the second user profile together creating a family of user profiles for a user, wherein the second user profile is accessed when content is requested from the second device, and the first user profile is accessed with content is requested from the first device.

8. The system of claim 7, wherein the personalization parameter is specified in a header.

9. The system of claim 7, wherein the personalization parameter is associated with a user of the first device.

10. The system of claim 7, wherein the first device specific content parameter is associated with a serial number of the first device.

11. The system of claim 7, further comprising a mobile switching center (MSC) in communication with the network.

12. The system of claim 7, wherein the first device further sends personalization identifiers to the network.

13. The system of claim 7, wherein the network stores the first user profile and the second user profile, the first user profile and second user profile each including a content identifier.

14. The system of claim 7, wherein the content is based on one or more of properties of the first device, a user location, and a user calendar data.

15. The system of claim 7, wherein the first device is a cellular phone.

16. The system of claim 15, wherein the content provider is configured to communicate with the first device via a publicly switched telephone network (PSTN).

17. The system of claim 7, wherein the content provider is configured to provide one or more of financial data, entertainment, and messaging.

\* \* \* \* \*